United States Patent [19]
Daniel et al.

[11] Patent Number: 5,321,837
[45] Date of Patent: Jun. 14, 1994

[54] EVENT HANDLING MECHANISM HAVING A PROCESS AND AN ACTION ASSOCIATION PROCESS

[75] Inventors: Arthur A. Daniel; Mark A. McKelvey; John A. Modry; Eric G. Roubal; Andrew E. Sandstrom; Patrick M. Wildt, all of Rochester, Minn.

[73] Assignee: International Business Machines Corporation, Armonk, N.Y.

[21] Appl. No.: 775,669

[22] Filed: Oct. 11, 1991

[51] Int. Cl.$^5$ .............................................. G06F 15/20
[52] U.S. Cl. .............................. 395/650; 364/DIG. 1
[58] Field of Search ................ 364/DIG. 1, DIG. 2; 395/650; 371/29.1

[56] References Cited

U.S. PATENT DOCUMENTS

| | | | |
|---|---|---|---|
| 4,517,468 | 5/1985 | Kemper et al. | 290/52 |
| 4,654,852 | 3/1987 | Bentley et al. | 371/29 |
| 4,833,629 | 5/1989 | Moore | 364/DIG. 1 |
| 4,868,763 | 9/1989 | Masui et al. | 364/513 |
| 4,884,218 | 11/1989 | Agnew et al. | 364/513 |

FOREIGN PATENT DOCUMENTS 0068106 1/1983 European Pat. Off. .

OTHER PUBLICATIONS

Nachrichten Electronik & Telematik, vol. 40, No. Spec. 2, Oct. 1986, pp. 45-46; "PC Checkt PC" (translation submitted herewith).

Primary Examiner—Thomas M. Heckler
Attorney, Agent, or Firm—Steven W. Roth

[57] ABSTRACT

Computer systems have the ability to monitor their components and operations, generate events which indicate the occurrence of a monitored condition (e.g. out of paper, Joe Smith just signed on, disk utilization nearing capacity, etc.), and process these events in some manner. The present invention provides significant enhancements to the latter capability.

The events of an event stream or streams are "filtered" into categories or groups of events. Once categorized, the invention associates an action or actions with the categorized event. The associated action can be logging the event, routing the event to the electronic address of a user, or sending the event to an application program for further processing.

45 Claims, 15 Drawing Sheets

FIG. 5

```
                    Work with Filter Entries
                                                     System:   RCHAS209
Filter . . . . . . . . . :  TIMOTHY
LIBRARY  . . . . . . . . :  TGFLIB
Type . . . . . . . . . . :  *ALERT Type options, press Enter.
  1=Add   2=Change   3=Copy   4=Remove   5=Display   7=Move Sequence ⎯50
Opt  Number   Group ⎯51   Selection data ⎯52                              53          54
 __   0010    HARDWARE1   *IF *MSGID *CT 9999 *AND *MSGSEV *GT 40
 __   0020    GROUP1      *IF *HARDWARE *CT '9406 ' , *OR *HARDWARE *CT '9...
 __   0030    BITBUCKET   *IF *RSCNAME *EQ CHI* *OR *RSCNAME *EQ DET*
 __   0040    GROUP2      *IF *MSGID *EQ CPF1234 *OR *MSGID *EQ CPD8933  ...
 __   0065    GROUP1      *IF *MSGID *NE CPF9999 *AND *MSGSEV *GE 40
 __   0080    *DEFAULT    *IF *MSGID *NE CPF9999 *AND *MSGSEV *LT 40
 __   0090    JOES        *IF *MSGSEV *LE 30 *AND *MSGID *LT CPF* ⎯55
 __   *LAST   *DEFAULT    *ANY
                                                                    Bottom
F3=Exit       F4=Prompt       F5=Refresh    F6=Print    F9=Command    F12=Cancel
F16=Repeat position to        F17=Position to
```

```
                    Work with Group Entries
                                                      System:   RCHAS209
Filter  . . . . . . . . :   TIMOTHY
Library . . . . . . . . :   TGFLIB
Type  . . . . . . . . . :   *ALERT Type options, press Enter.
  1=Add   2=Change   3=Copy   4=Remove   5=Display   7=Rename Opt  Group     70      Actions     71
     BITBUCKET         LOG(*NO)     ASNUSER(*NONE)    SEND(*NONE)   SNDDTAQ(*NONE)
     GROUP1            LOG(*YES)    ASNUSER(*NONE)    SEND(*FOCALPT) SNDDTAQ(*NONE)
     GROUP2            LOG(*NETATR) ASNUSER(THOMAS)   SEND(APPN.DETROIT) SEND(*FOC...
     HARDWARE1         LOG(*YES)    ASNUSER(*NONE)    SEND(*FOCALPT) SEND(NORTHWST.STP...
     HARDWARE2         LOG(*YES)    ASNUSER(*NONE)    SEND(*NONE)    SNDDTAQ(USERLIB/HARD...
     JOES              LOG(*NETATR) ASNUSER(CARL)     SEND(*FOCALPT) SNDDTAQ(*NONE)
     TROUBLE           LOG(*YES)    ASNUSER(DEBRA)    SEND(*FOCALPT) SEND(EASTSEA.HEAD...
     TEMPLOOK          LOG(*YES)    ASNUSER(JOSHUA)   SEND(*NONE)    SNDDTAQ(*NONE)
     *DEFAULT          LOG(*NETATR) ASNUSER(*NONE)    SEND(*FOCALPT) SNDDTA(*NONE)
                                                                              Bottom
F3=Exit     F4=Prompt     F5=Refresh     F6=Print     F9=Command     F12=Cancel
F16=Repeat position to    F17=Position to
```

FIG. 7

Example Raw Event Stream
Event Structure

113 ↘          ↙ 112

| Element Number 1 | Element Value |
|---|---|
| Element Number 2 | Element Value |
| Element Number 3 | Element Value |
| Element Number 4 | Element Value |
| Element Number 5 | Element Value |
| Element Number 6 | Element Value |
| Element Number 7 | Element Value |
| Element Number 8 | Element Value |
| Element Number 9 | Element Value |
| Element Number 10 | Element Value |

FIG. 11

Example Standardized Event Stream
Event Structure

| Element Number 1 | Element Type | Element Value |
|---|---|---|
| Element Number 4 | Element Type | Element Value |
| Element Number 5 | Element Type | Element Value |
| Element Number 7 | Element Type | Element Value |
| Element Number 8 | Element Type | Element Value |
| Element Number 10 | Element Type | Element Value |

FIG. 12

EVENT HANDLING MECHANISM HAVING A PROCESS AND AN ACTION ASSOCIATION PROCESS

FIELD OF THE INVENTION

This invention relates to the data processing field. More specifically, this invention is an event handling mechanism that categorizes the events of a raw event stream into groups of events and associates an action or actions with each group.

BACKGROUND OF THE INVENTION

The system software of today's single and multiple processor environments usually includes a crude event handling mechanism. The purpose of this mechanism is to provide some degree of control for the potentially large amount of event traffic on the system's communication networks. It is the responsibility of an event handling mechanism to route and/or coordinate the event traffic to best utilize the resources of the system. Existing event handler implementations perform various operations on an event stream. Examples include the deletion, logging, and/or display of certain events, usually on a system console monitored by a system administrator. These event handlers are "hard coded" to handle particular events and particular streams of events. When new events are added to an event stream, major modifications to the event handler must in turn be made to accommodate them. In some cases an entire new event handler is required. A new event handler is almost always required whenever support for a new or different event stream protocol is desired. This situation is further complicated when one considers a system that supports multiple event streams and thus includes multiple event handlers. In this latter system, the addition of a newly supported protocol not only means that a new event handler is required, but it also means that the software that coordinates the event handlers must also be rewritten.

The result of the cost and complexity associated with these modifications is the inability to provide significant function to the end user (e.g., system administrator). For the most part, the example functions cited above (i.e., deletion, logging, and display on a system console) typify current event handler implementations. This limited function in turn results in several problems: entire categories of events must be deleted to accommodate more important categories, some events are never seen because the system console is unattended when an event appears, and logs are so large that it is difficult to detect events of significance. In general, this makes the system administrator task more difficult because that person has only limited control over a large portion of the information necessary to perform their job.

SUMMARY OF THE INVENTION

It is a principle object of this invention to provide for the effective, efficient, and cost reduced management of a computer system's event streams.

It is another object of this invention to provide the system administrator with the ability to dynamically categorize and re-categorize the events of a system's event stream(s).

It is still another object of this invention to provide the system administrator with the ability to dynamically modify how the system processes particular events or groups of events without having to change how the events have been categorized.

These and other objects are accomplished by the event handler mechanism disclosed herein.

Computer systems have the ability to monitor their components and operations, generate events which indicate the occurrence of a monitored condition (e.g. out of paper, Joe Smith just signed on, disk utilization nearing capacity, etc.), and process these events in some manner. The present invention provides significant enhancements to the latter capability.

The events of an event stream or streams are "filtered" into categories or groups of events. Once categorized, the invention associates an action or actions with the categorized event. The associated action can be logging the event, routing the event to the electronic address of a user, or sending the event to an application program for further processing.

The filtering process is accomplished through the use of four discrete components: a filter table, a filter table maintenance mechanism, a parsing mechanism, and a filter table processing mechanism. The filter table is maintained by the system administrator, and contains a plurality of filter entries. The filter entries in turn contain a sequence number, a group identifier, and certain selection criteria. The selection criteria includes a collection of element types, values, and operators. The system administrator uses the filter table maintenance mechanism to create, modify, and delete both the filter entries and the filter table itself. In doing so, the system administrator is given the ability to categorize all events of an event stream.

The parsing mechanism parses out select elements of each event contained in a raw event stream. These elements then comprise a standardized event. The parsing mechanism produces the same standardized event regardless of the form of the events in the raw event stream. The filter table processing mechanism then takes the selection criteria of the filter entries and applies them to the element types and values of the standardized event. If a match is detected, the group identifier is passed to the action mechanism of the invention. If not, a default group identifier is passed on.

The action mechanism of the invention entails three discrete components: an action table, an action table maintenance mechanism, and an action table processing mechanism. The action table is maintained by the system administrator. The action table contains a plurality of group or event entries. The group entries are used when groups are provided by the filtering process discussed above, or when an application program supplies categorized events to this portion of the invention. In contrast, the event entries are used where no grouping or categorization is performed. The group and event entries contain a group or event identifier and associated actions, such as routing the event to an electronic address or another application program. The system administrator will use the action table maintenance mechanism to create, modify, and delete the group entries, event entries and the action table itself. In doing so, each event or group of events will be acted upon in the same manner.

In operation, the action table processing mechanism will attempt to match the subject group or event with a group or event entry in the action table. If there is a match, the action table processing mechanism will route the event to an application program or the electronic address of one or more end users. If there is not a match, the action table processing mechanism will route the event to a default destination such as the system console or "bit bucket".

BRIEF DESCRIPTION OF THE DRAWINGS

FIGS. 5 and 7 depict the user interface of the preferred embodiment.

FIG. 11 shows an example event that could be handled by the invention.

FIG. 12 shows an exemplary result of the initial parsing step.

DESCRIPTION OF THE PREFERRED EMBODIMENT

Figure 1:
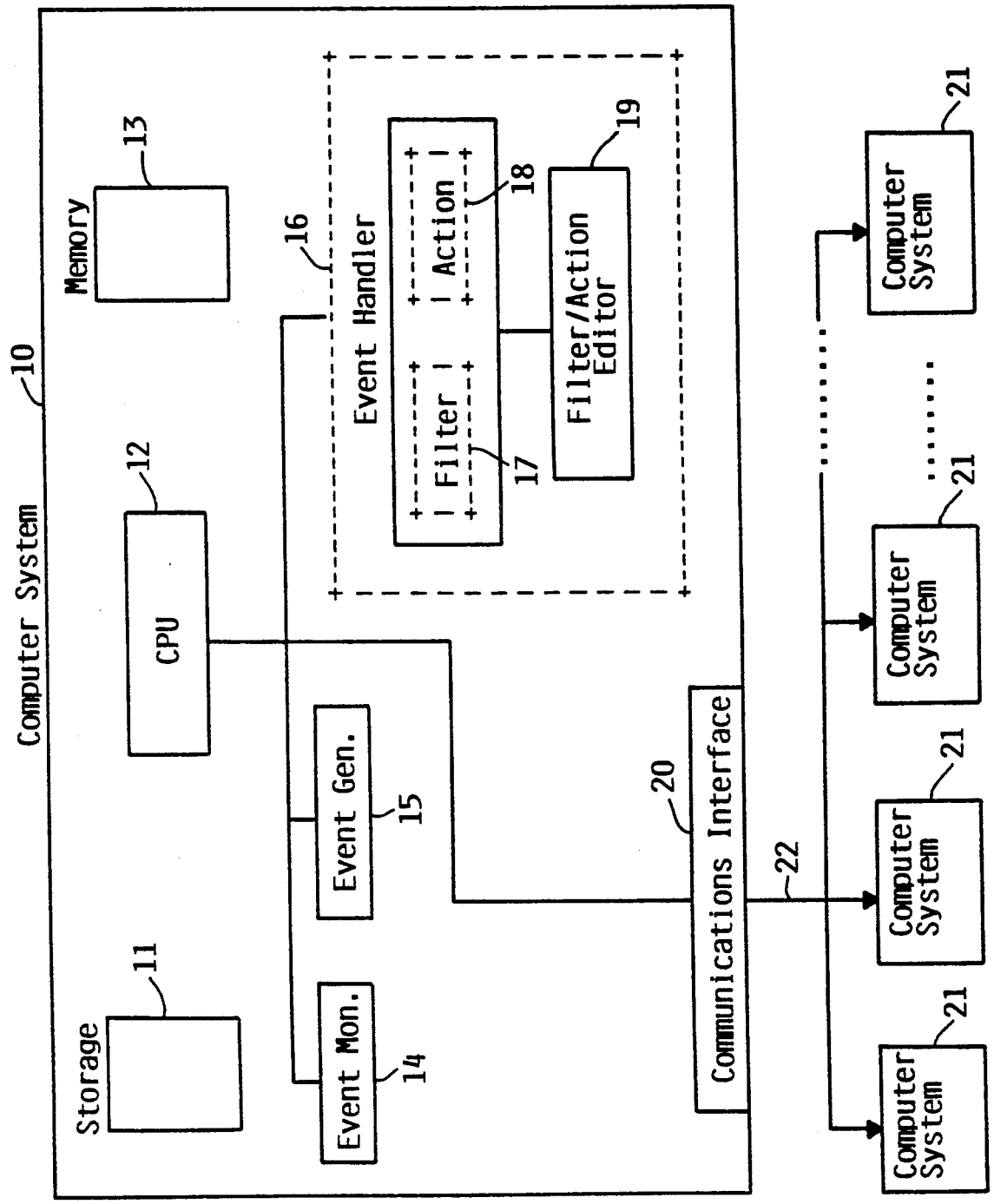
FIG. 1 shows the computer system of the invention.

FIG. 1 shows a block diagram of the computer system 10 of the invention. Computer system 10 contains storage 11, CPU 12, memory 13, event monitor 14, event generator 15, event handler 16, and communications interface 20. Although the discussion of the preferred embodiment focuses on events received from communications interface 20, it is important to note that the invention also applies equally to events received from other internal entities that are capable of generating events. FIG. 1 also shows connections to other computer systems 21 via communications line 22. The invention itself is located in event handler 16. Event handler 16 contains filter mechanism 17, action mechanism 18, and editor 19.

In the preferred embodiment, computer system 10 is an Application System/400 midrange computer system, although other computer systems such as personal computers and mainframe computer systems could also be used. In addition, communications line 21 could be a direct connection cable, a local area network, telecommunications link, or other form of operatively connecting computer together.

Figure 2:
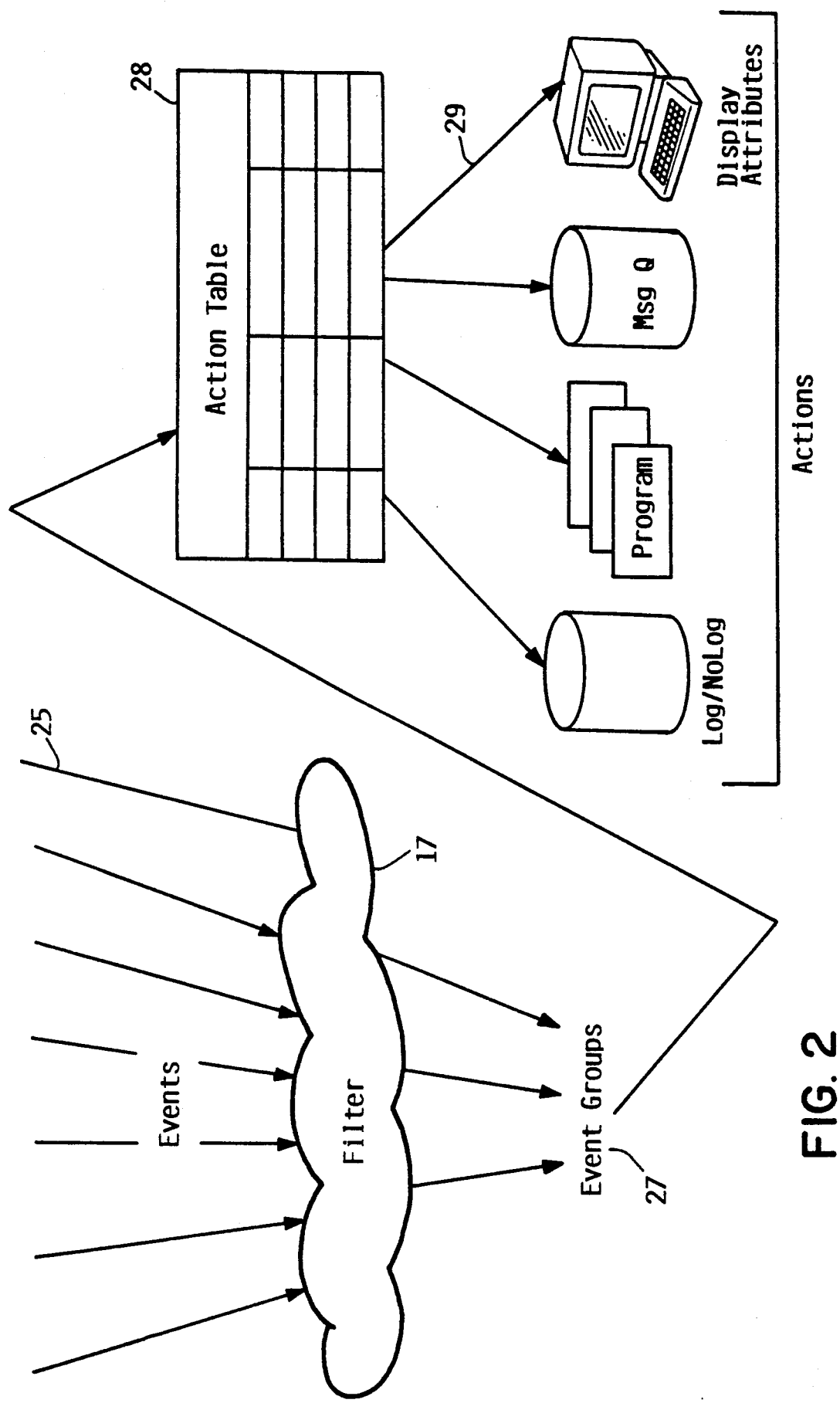
FIG. 2 shows the process flow of the preferred embodiment.

Referring now to FIG. 2, events 25 are shown as input to event handler 16 of the invention. Events 25 could represent any type of event stream. All possible events that can be generated by event generator 15 and sent to event handler 16 in a continuous or discontinuous fashion as computer system 10 is operating will be referred to herein as an event stream. When each event encounters filter 17, it is labeled as being a member of a particular event group 27. The invention then uses the event group label (event group 27) and action table 28 to decide what actions 29 are appropriate for this event 25. The various actions 29 are then performed by the system.

Figure 3:
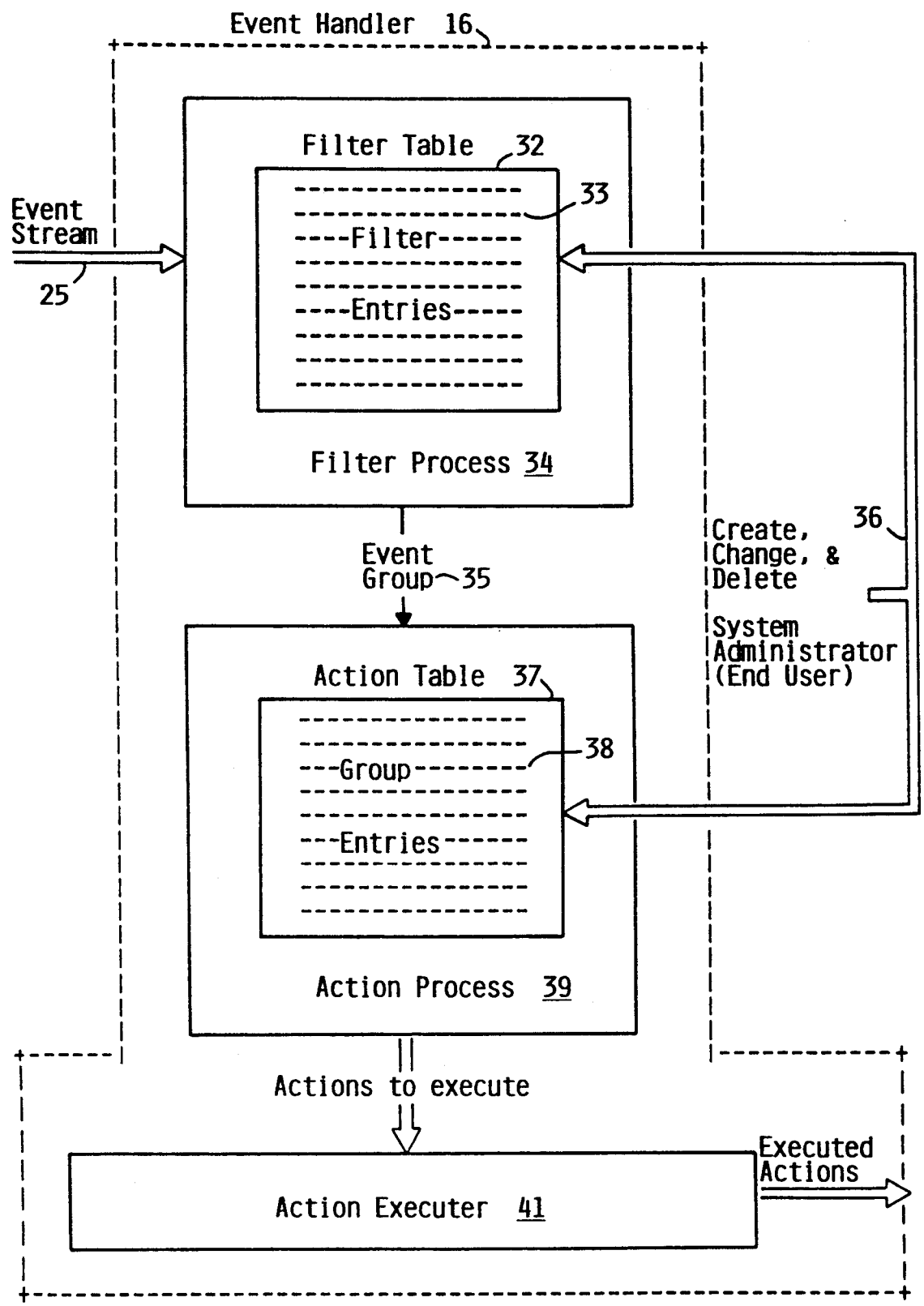
FIG. 3 shows the two logical functions of the preferred embodiment and their interaction with the system administrator.

FIG. 3 shows event handler 16 in more detail. As mentioned above, the events of raw event stream 25 first encounter filter mechanism 17. The filter process 34 uses a filter table 32 to filter (or label as mentioned above) the events into an event group 35. Filter table 32 contains filter entries 33. These filter entries are used to determine which event group is appropriate for the subject event. Once this determination is made, event group 35 is passed on to action process 39. To decide what actions are required, the action process 39 compares the group entries 38 of the action table 37 to the event group 35. Action executer 41 then uses this information to execute the actions.

Figure 4:
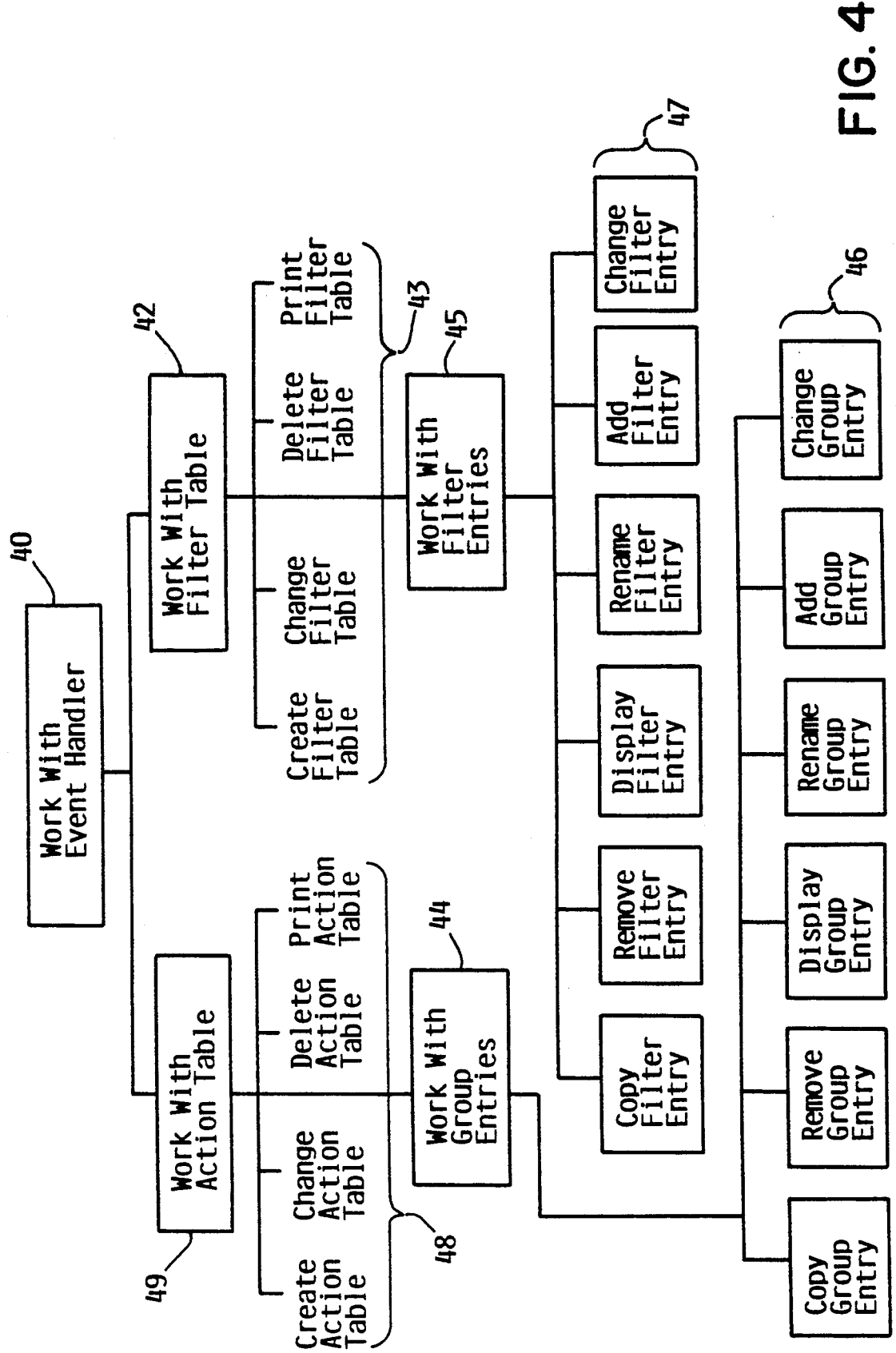
FIG. 4 shows the process flow of the filter table and action table maintenance mechanisms of the preferred embodiment.

FIG. 3 further depicts the ability of the system administrator 36 to create and modify the filter table 32 and the action table 37. A "system administrator" referred to herein is normally one or more persons responsible for the continued operation of computer system 10. If computer system 10 is a personal computer, the user of the personal computer or the person responsible for the continued operation of the local area network would be considered to be the system administrator. FIG. 4 describes this ability in more detail.

Referring now to FIG. 4, the system administrator would first elect to work with the event handler function 40. The system administrator can choose which filter to work with and what type of filter he or she would like it to be. These choices are significant in that they give the system administrator control over what filters are used for what purposes. This flexibility is important because the event handler of the preferred embodiment utilizes different filter tables in different situations. Next, the system administrator must elect to work with the action table 49 or work with the filter table 42. Once the choice has been made, the system administration can create, change, delete, or print either of the two logical constructs (i.e. the filter table or the action table). Another option at this level is the ability to perform operations on the entries of either of the logical constructs 44 and 45. An entry can be added, copied, changed, removed, displayed, or renamed, 46 and 47.

FIG. 5 depicts the screen that is seen when the system administrator elects to work with the filter table's entries. Each filter entry contains a sequence number 50, a group identifier (group 51), and selection criteria (selection data 52). Sequence number 50 is used to control the order in which the filter table is searched. Group identifier 51 represents the category in which events can be placed. The selection criteria 52 is used to determine the category in which the subject event belongs. It does so, by using the elements of each event. In particular, the selection criteria is used to determine whether an event's element types and the associated values satisfy the test set forth in the selection criteria itself. Boolean expressions which include relational operators, Boolean operators, or both are used to create the "test" of the selection criteria.

Figure 6:
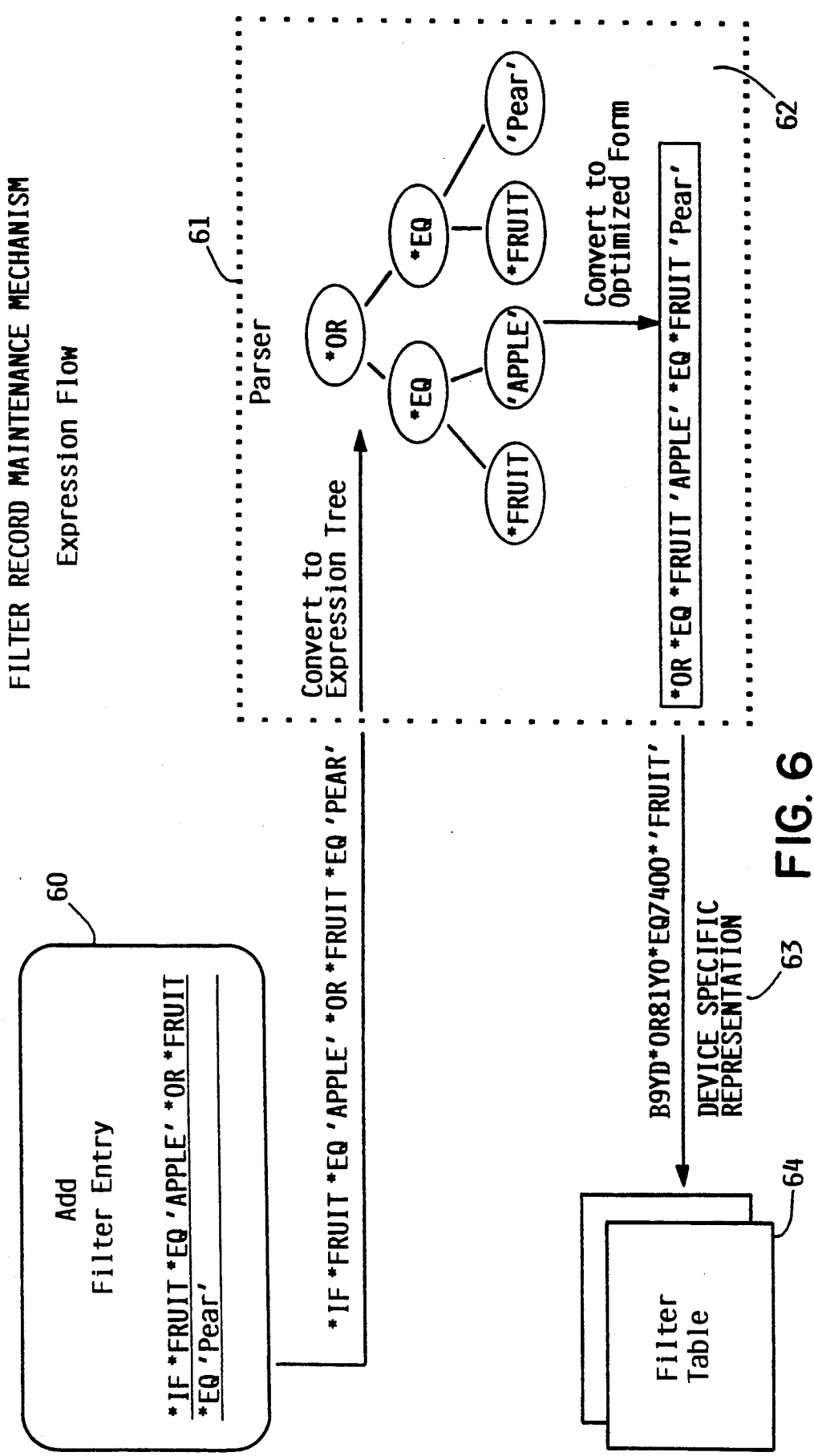
FIGS. 6 and 8 show how the user's input is manipulated after its entry.

FIG. 6 depicts the expression flow of the screen shown in FIG. 5. The add filter entry function 60 converts the user information into a device specific data format 63. In the preferred embodiment, the use of the add filter entry function 60 results in the information being parsed 61 and then converted into an optimized form 62. The preferred embodiment uses a generic parser which first converts the expression into an infix binary expression tree containing relational and Boolean operators. The filter table parser then converts the tree into a prefix data stream for high performance string-based evaluation. The device specific data format 63 is a single stream prefix expression that contains a length, a Boolean or relational operator, and the right and left sub-expressions recursively listed. The single stream representation containing lengths and recursive expressions allows for optimized evaluations by reducing the number of sub-expression evaluations needed. It is in this fashion that the system administrator's categorization scheme is represented in the filter table 64.

FIG. 7 depicts the screen that is seen when the system administrator elects to work with the action table's entries. Each action table entry contains a group identifier (group 70) and at least one associated action 71. Associated actions can be routing the event to one or more electronic addresses of specific users, logging the event in a specific log, or sending the event to an application program, as shown in FIG. 7.

Figure 8:
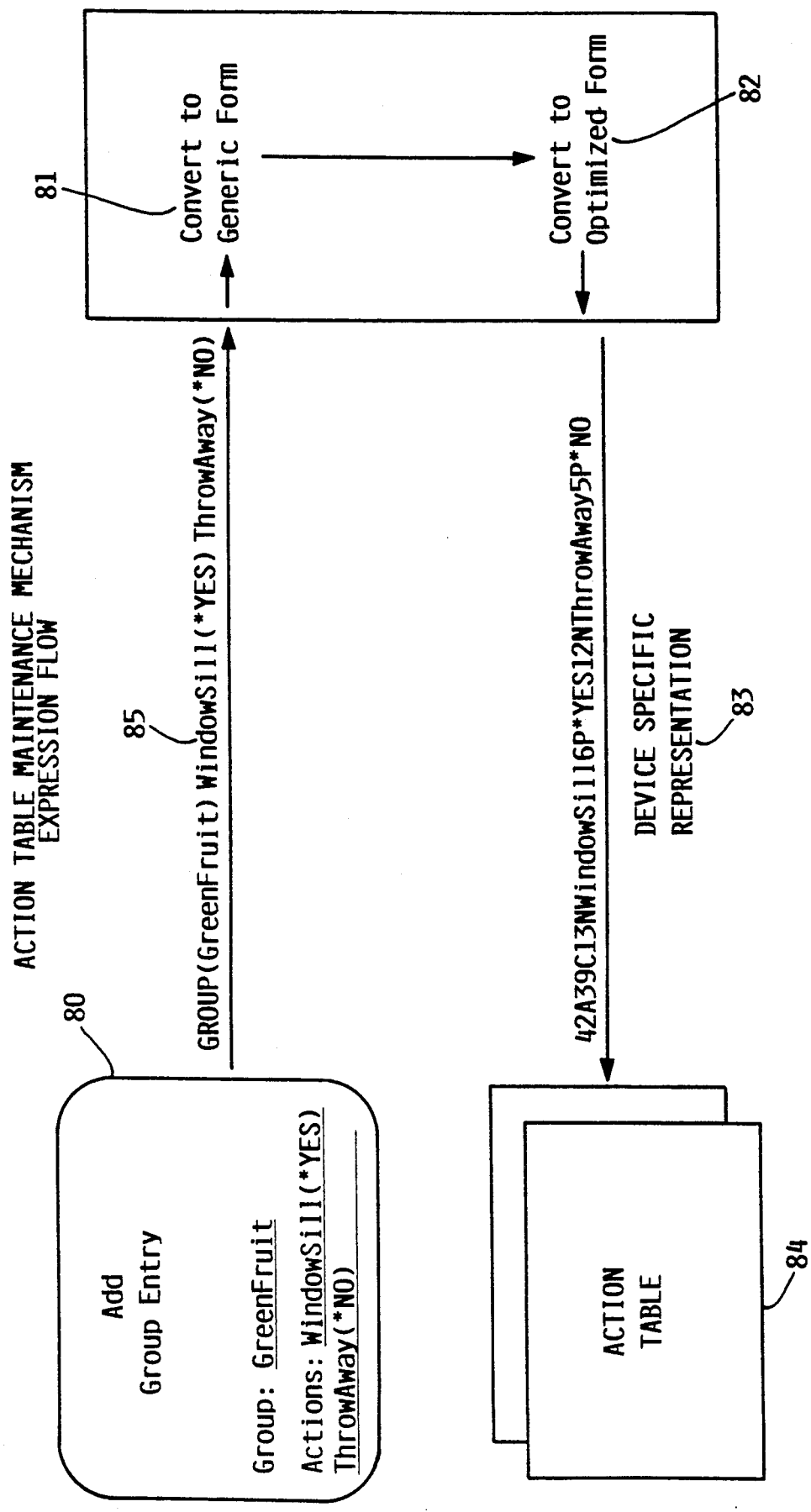

FIG. 8 depicts the expression flow of the screen shown in FIG. 7. In the preferred embodiment, the use of the add group entry function 80 results in the information being converted into a generic form 81 and then into an optimized form 82. The data's resultant form is device specific 83. It is in this fashion that the system administrator's action association scheme is represented in action table 84. In the preferred embodiment, the add group entry function 80 converts the specific action (parameter) information 85 into generic actions ((action 1, parameter 1) . . . (action N, parameter N)) format 81. The generic format 81 allows the add group entry function 80 to convert any action into the internal device specific data 83. The internal device representation 83 identifies the data as a group entry which identifies the group (category), and lists the actions and parameters.

Figure 9:
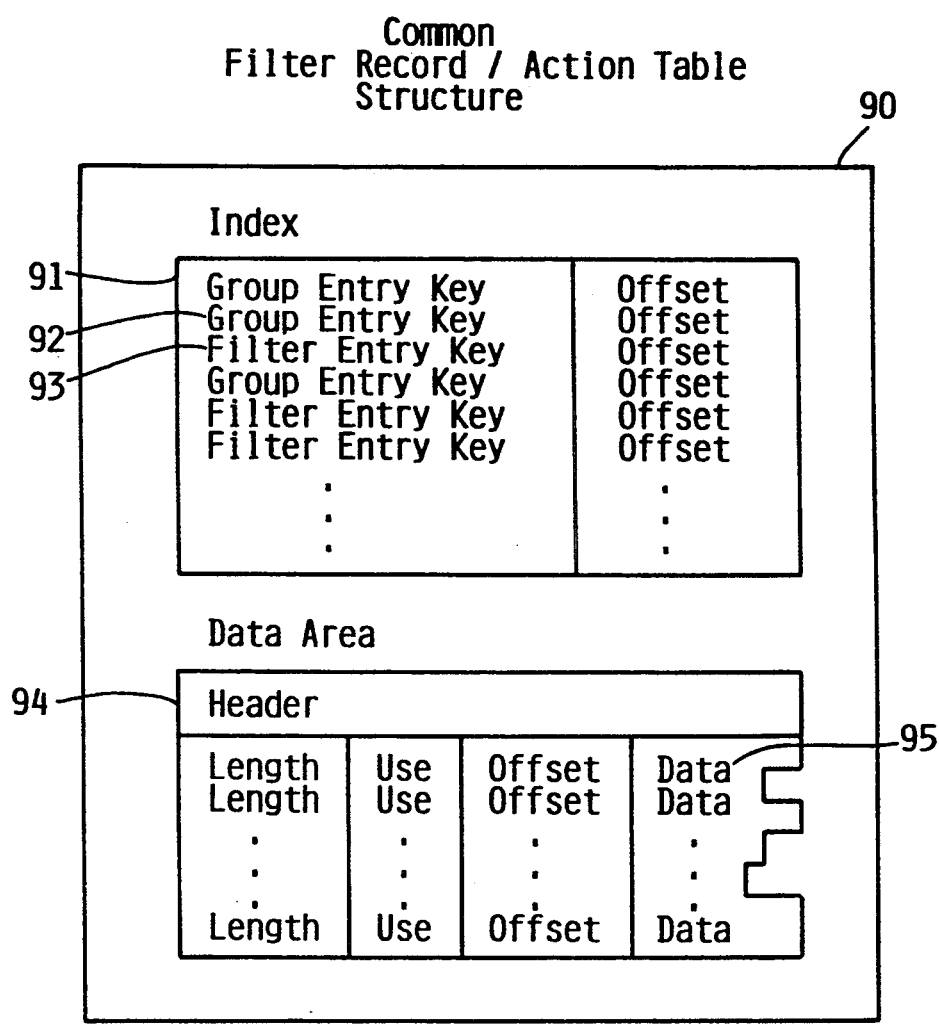
FIG. 9 shows the table structure of the invention.

FIG. 9 shows the combined filter table/action table structure 90 of the preferred embodiment. Though it is conceptually easier to think of the filter table and action table as separate data structures, they are actually combined into a single data structure in the preferred embodiment. In the preferred embodiment, keys for filter 93 and group entries 92 are placed in index 91. When retrieval is needed, the offsets in the index are used to gain access to the data area 94 where the data 95 is stored.

Figure 10:
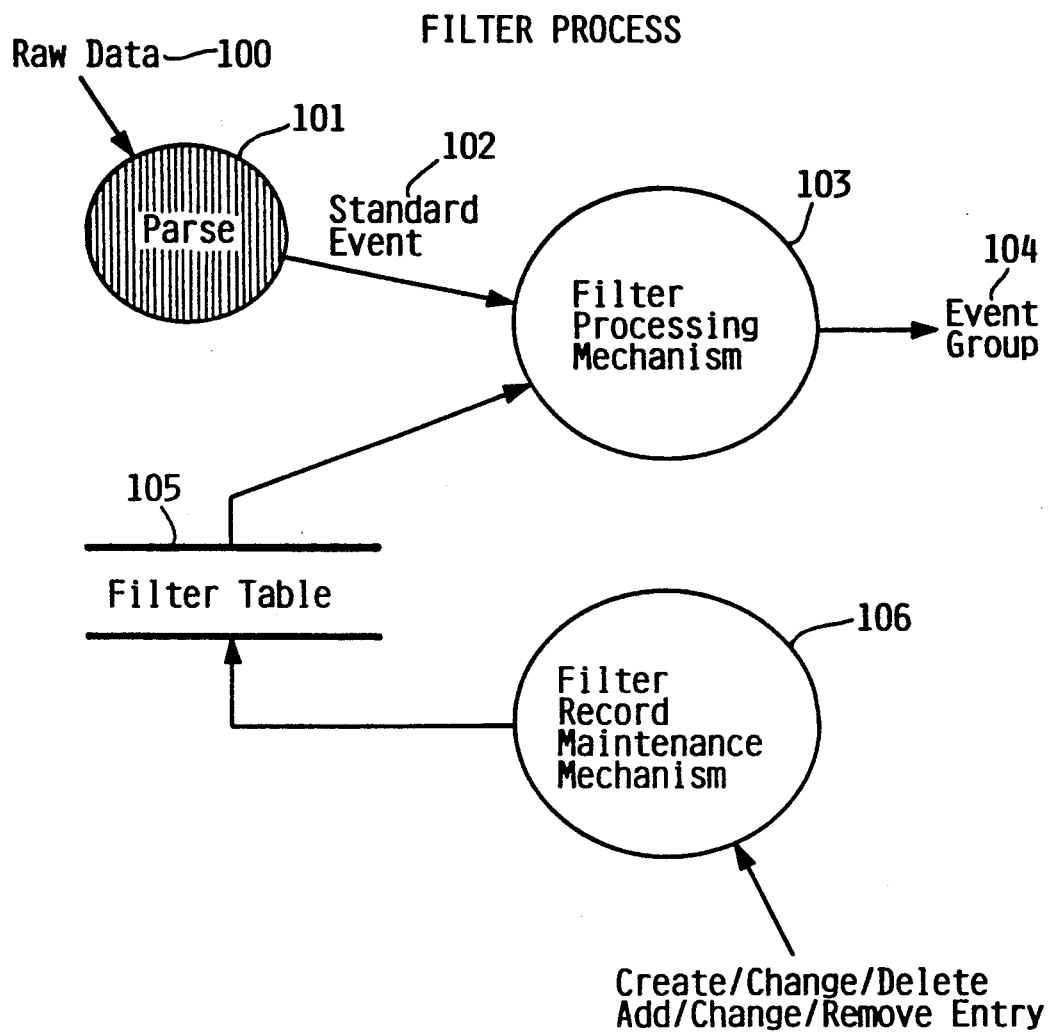
FIGS. 10, 13, and 14 are flow diagrams describing the processes of the preferred embodiment.

FIG. 10 depicts the four conceptual entities of the filter process (first described as the filter function at 17 in FIG. 1). The filter table and filter maintenance mechanism were explained in the discussion of FIGS. 4, 5, 6. The parsing mechanism 101 is responsible for converting the raw data events 100 into standardized events 102. The event of FIG. 11 is an example of what an event could look like prior to parsing. As was mentioned in the discussion of FIG. 5, the filter table's selection criteria is primarily concerned with the event's element types 111 and the associated values 112. Hence, it is the parsing mechanism's task to parse out the important elements and assign them a type. It is particularly important that this is done consistently regardless of the type of event received. An example is shown in FIG. 12 where only those elements that are actually needed are placed into the standardized event. Returning now to FIG. 10, it is seen that the standardized event is presented to the filter table processing mechanism 103. The filter table processing mechanism 103 will use the selection criteria of the filter entries from filter table 105 to discern a match. Once accomplished, the filter processing mechanism 103 will pass the group identifier (event group 104) to the action processing function.

Figure 13:
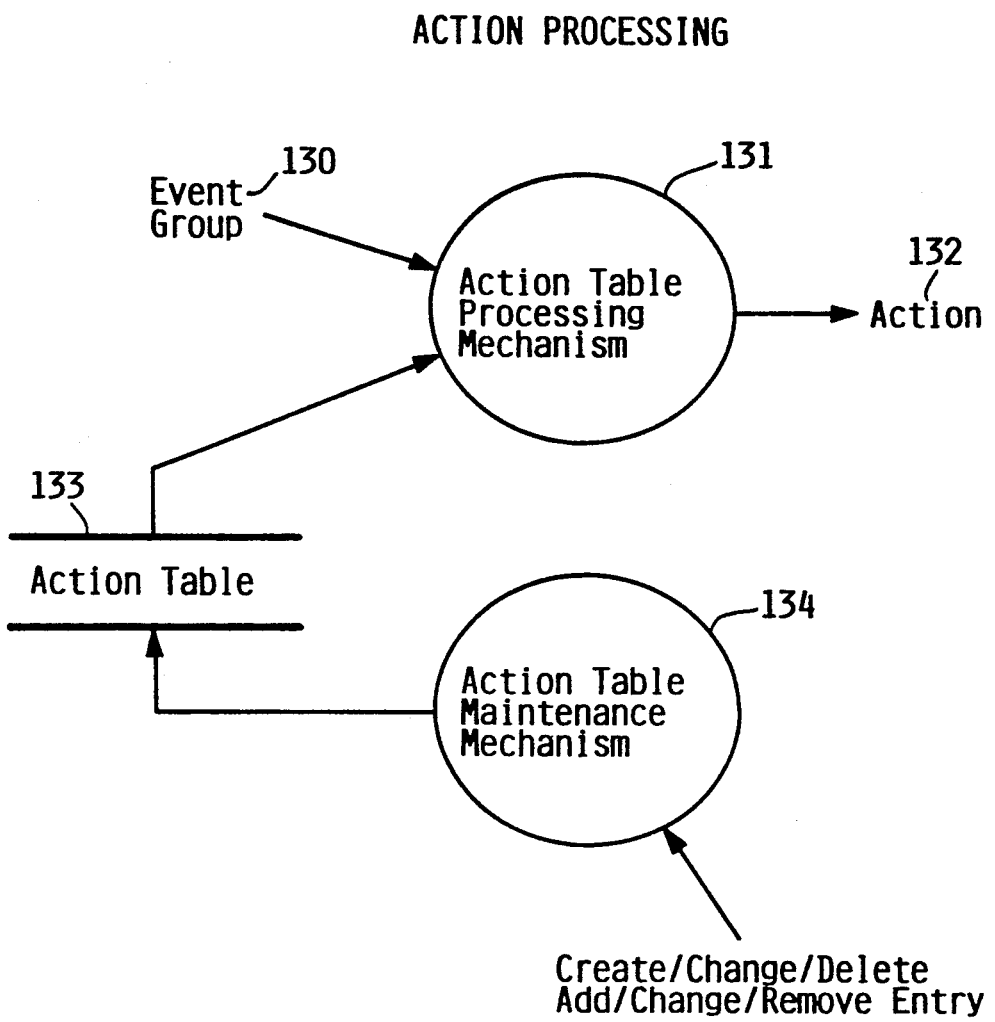

FIG. 13 describes action processing (first described as action mechanism 18 in FIG. 1). The action table and action table maintenance mechanism were described in the discussion regarding FIGS. 4, 7, and 8. The action table processing mechanism 131 uses the event group passed to it by the filter table processing mechanism to locate the appropriate action 132 contained in the action table 133. Once located, the action table processing mechanism 131 passes the action 132 on to be executed as indicated.

Figure 14:
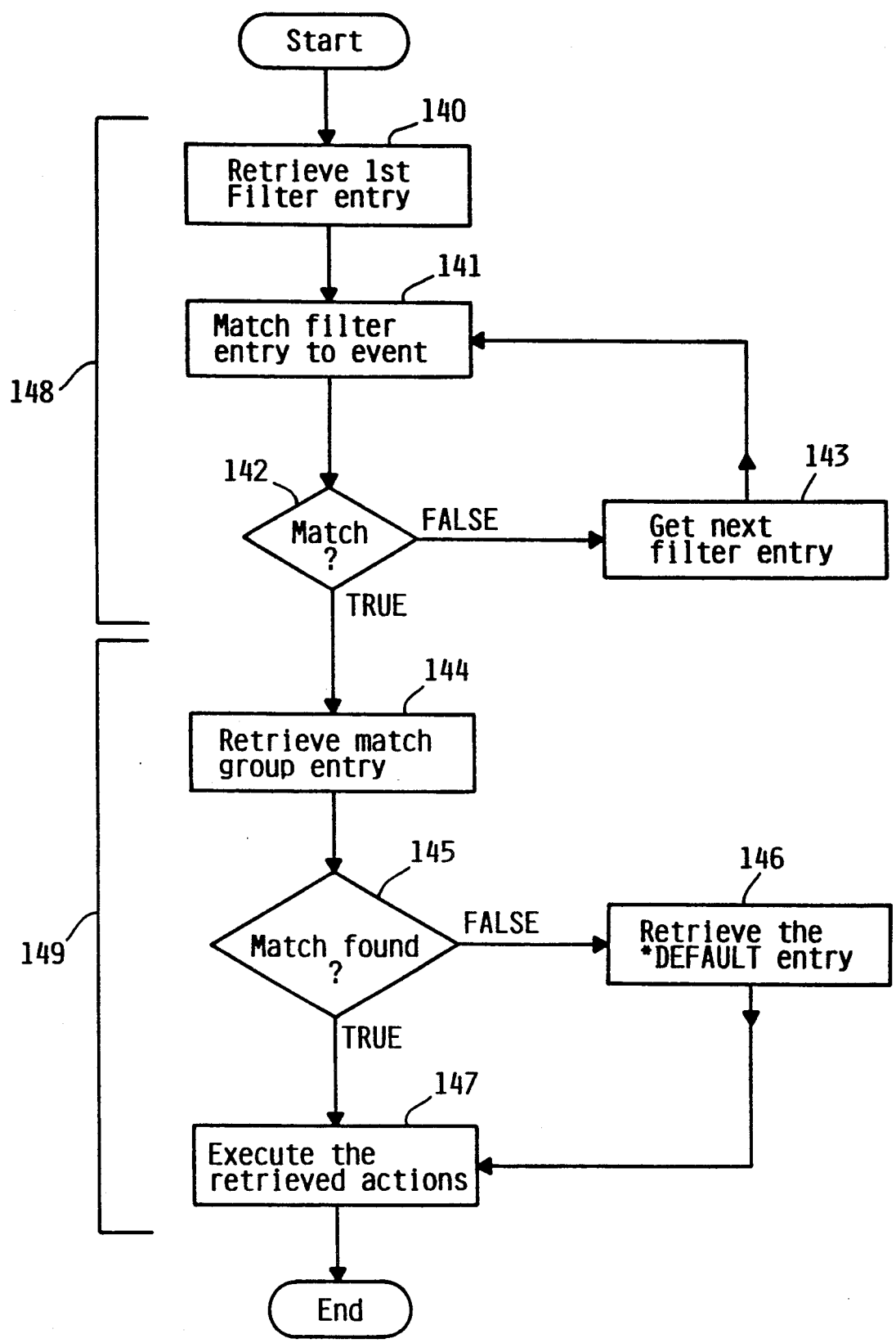

FIG. 14 is a flow diagram that shows the steps used by the filter processing 148 and the action table processing 149 mechanisms and how the two mechanisms interact. The filter processing mechanism begins by retrieving the first filter entry at block 140. The filter processing mechanism will then traverse the expression tree of FIG. 6 and attempt to locate a match 141. If a match is achieved, the associated group identifier is passed to the action table processing mechanism 149. If a match is not found, the next filter entry is retrieved at block 143 and the process is repeated. If a match is not achieved before the last filter entry is evaluated, a default group identifier (which automatically "matches" events not matched by other entries) is used. When the action table processing mechanism 149 receives the group identifier, it will attempt to locate the correct group entry in the action table 144. If the group identifier exists within the action table, the associated action is executed by block 147. If the group identifier does not exist within the action table, a default entry is used in block 146. This results in a default action being passed on to block 147.

Figure 15:
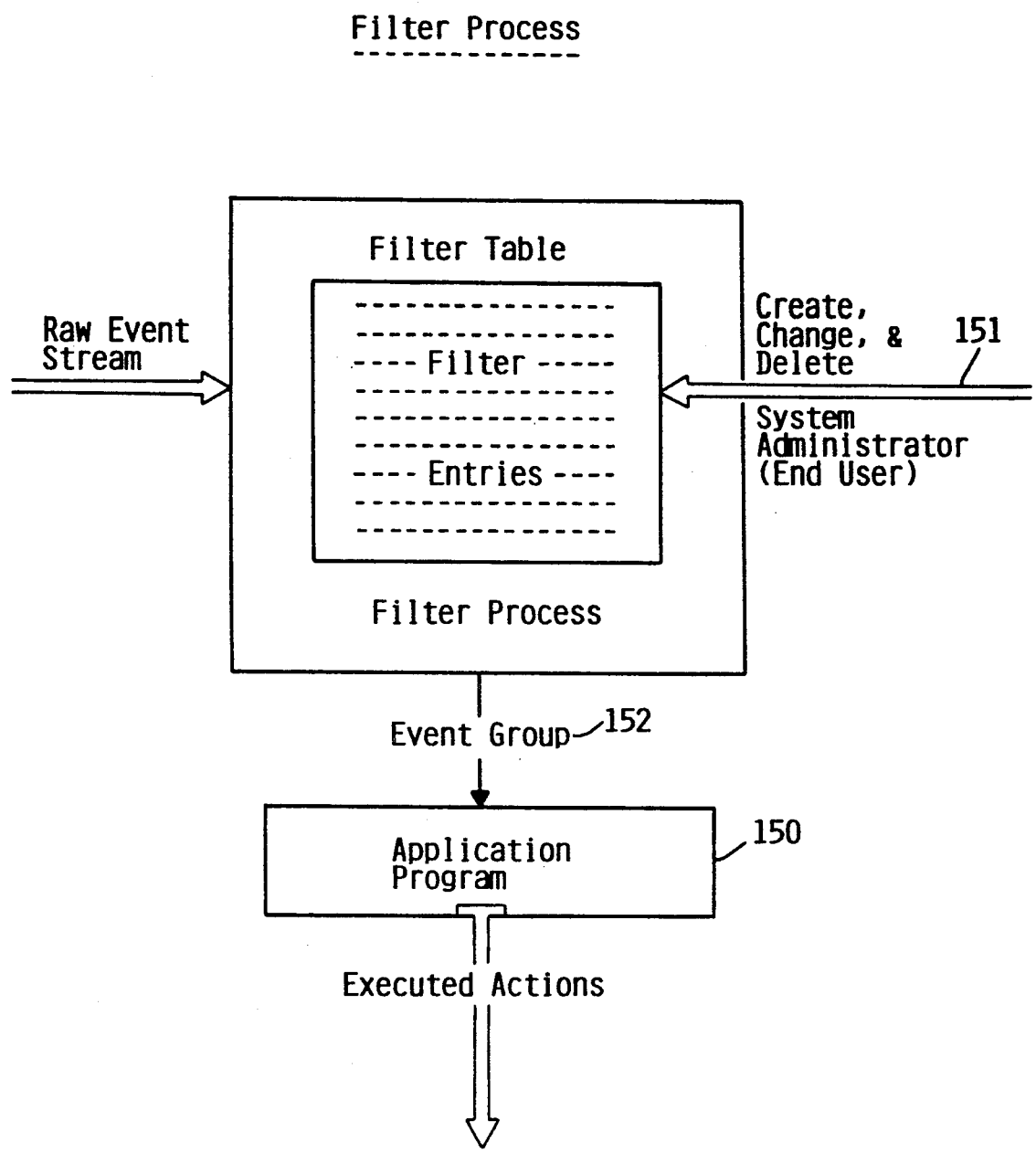
FIGS. 15 and 16 depict alternate embodiments of the invention.

FIG. 15 depicts one possible alternate embodiment. In this embodiment, a filter process could be used without the companion action processing. The application program 150 would receive the event groups 152 directly and perform both the action association function and action execution function. Although this embodiment does not provide the flexibility of the preferred embodiment, it still represents an improvement over existing implementations. The system administrator 151 retains the flexibility of being able to control how events are to be categorized.

Figure 16:
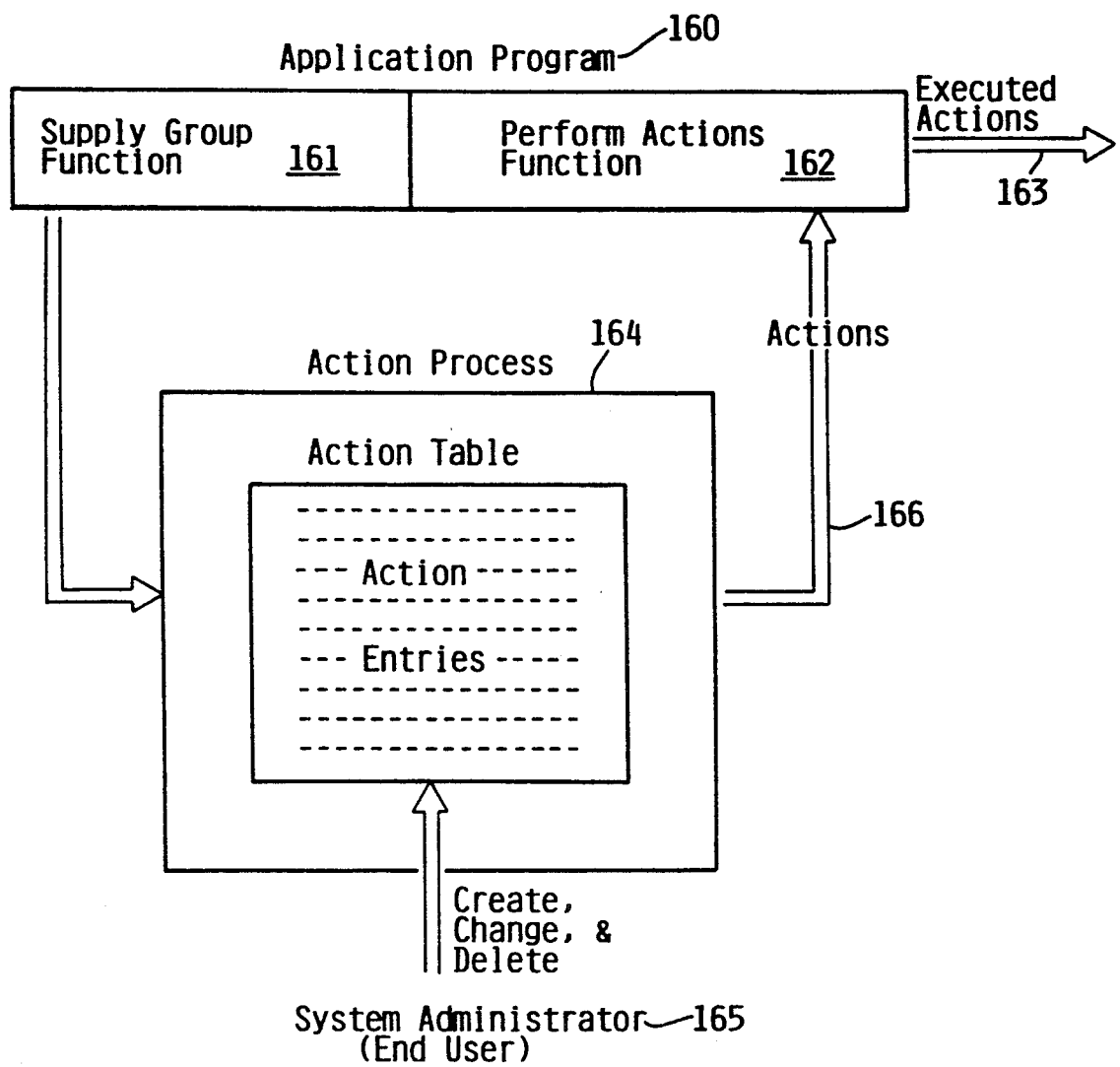

The second alternate embodiment, shown in FIG. 16, is the inverse of the first. In this embodiment, an action process is used without the companion filter processing. The application program 160 provides group information 161 directly to the action process 164. This can be done in "real time" or be the result of a previous filtering activity of the same or different filter type. The action process then supplies the actions back to the application program 166. The application program 160 then executes the actions just as in the preferred embodiment.

A third alternate embodiment is a variation of the second. In this embodiment, the action processing would accept raw events directly without the need for prior handling by either the filter process or an application program. The system administrator would use the action table to associate events to actions rather than groups of events to actions. In that way, the system administrator would have the power to create and modify how the computer system reacts to certain events.

Although a specific embodiment of the invention has been disclosed along with certain alternatives, it will be recognized by those skilled in the art that additional variations in form and detail may be made within the scope of the following claims.

What is claimed is:

1. A method for handling events in an event stream, said events being generated by external and internal entities, said method comprising the machine-executed steps of:
- accepting as input a user created categorization scheme, said user created categorization scheme being used to construct a filter table;
- receiving as input said events;
- applying said events to said filter table; and
- categorizing said events into groups of events based on a comparison of characteristics of said events with information contained in said filter table.

2. The method of claim 1 wherein said accepting step further comprises the machine-executed steps of:
- accepting user input to modify said categorization scheme by changing said filter table, said categorization scheme being modified to change how said events are categorized into groups of events.

3. The method of claim 1 wherein said accepting step further comprises the machine-executed step of:
- accepting as user input a plurality of sequentially arranged filter entries into said filter table, said filter entries being compared against characteristics of each of said events to categorize said events into groups of events.

4. The method of claim 3 wherein said accepting steps further comprises the machine-executed steps of:
- accepting as input a group identifier, a sequence number, and a set of selection criteria; and
- adding said group identifier, said sequence number, and said set of selection criteria to each of said filter entries.

5. The method of claim 4 wherein said accepting step further comprises the machine-executed step of:
- accepting as user input element types, values, and operators, said element types, said values, and said operators being part of said selection criteria, said element types, said values, and said operators being compared against characteristics of each of said events to categorize said events into groups of events.

6. The method of claim 5 wherein said accepting step further comprises the machine-executed steps of:
- accepting as user input a wild card character identifier; and
- placing said wild card character identifier into said value.

7. The method of claim 6 wherein said applying step further comprises the machine-executed steps of:
- using said sequence number to search through said filter entries;
- matching said element types and said values to a particular element's type and value; and
- interpreting said wild card character identifiers.

8. The method of claim 1 wherein said receiving step further comprises the machine-executed step of:
- parsing said events into standardized events.

9. An apparatus for handling events in an event stream, said events being generated by external and internal entities, said apparatus being a computer system and comprising:
- means for accepting a user created categorization scheme, said categorization scheme being used to construct a filter table;
- means for receiving as input said events;
- means for applying said events to said filter table; and
- means for categorizing said events into groups of events based on a comparison of characteristics of said events with information contained in said filter table.

10. The apparatus of claim 9 wherein said means for accepting further comprises:
- means for accepting user input to modify said categorization scheme by changing said filter table, said categorization scheme being modified to change how said events are categorized into groups of events.

11. The apparatus of claim 10 wherein said means for accepting user input further comprises:
- means for parsing said user input into a device specific representation.

12. The apparatus of claim 11 wherein said categorization scheme comprises a filter table, said filter table comprising a plurality of sequentially arranged filter entries, each of said filter entries comprising a group identifier, a sequence number, and a set of selection criteria.

13. The apparatus of claim 12 wherein said set of selection criteria comprises a set of element types, values, and operators, said operators being relational, said element types, said values, and said operators being compared against characteristics of each of said events to categorize said events into groups of events.

14. The apparatus of claim 13 wherein said operators are boolean.

15. The apparatus of claim 14 wherein said value comprises a wild card character identifier.

16. The apparatus of claim 15 wherein said means for applying further comprises:
- means for using said sequence numbers to search through said filter entries;
- means for matching said element types and said values to a particular element's type and value; and
- means for interpreting said wild card character identifiers.

17. The apparatus of claim 9 wherein said means for receiving further comprises:
- means for parsing said events into standardized events.

18. A method for receiving an event from an event stream and associating particular actions to said event, said event being generated by external and internal entities, said method comprising the machine-executed steps of:
- accepting as input a user created action association scheme, said action association scheme being used to construct an action table;
- receiving as input said event;
- applying said event to said action table to determine said particular actions, said particular actions being determined by comparing characteristics of said event with information contained in said action table; and
- outputting said particular actions to an application program for further processing.

19. The method of claim 18 wherein said accepting step further comprises the machine-executed steps of:
- accepting user input to modify said action association scheme by changing said action table, said action association scheme being modified to change how said event is associated with said particular actions.

20. The method of claim 19 wherein said accepting step further comprises the machine-executed step of:
- accepting as user input a plurality of event entries into an action table, said event entries being compared against characteristics of said event to associate said particular actions with said event.

21. The method of claim 20 wherein said accepting step further comprises the machine-executed steps of:
accepting as input an event identifier and actions; and
adding said event identifier and said actions to each of said event entries.

22. The method of claim 21 wherein said applying step further comprises the machine-executed steps of:
using said event identifiers to search through said event entries; and
matching said event identifier to a particular event's type.

23. The method of claim 18 wherein said outputting step further comprises:
sending said particular actions to a person located at an electronic address on a computer system.

24. An apparatus for receiving an event from an event stream and associating particular actions to said event, said event being generated by external and internal entities, said apparatus being a computer system and comprising:
means for accepting as input a user created action association scheme;
means for receiving as input said event;
means for applying said event to said action table to determine said particular actions, said particular actions being determined by comparing characteristics of said event with information contained in said action table; and
means for outputting said particular actions to an application program for further processing.

25. The apparatus of claim 24 wherein said means for creating further comprises:
means for accepting user input to modify said action association scheme by changing said action table, said action association scheme being modified to change how said event is associated with said particular actions.

26. The apparatus of claim 25 wherein said means for creating further comprises:
means for accepting as user input a plurality of event entries into said action table, said event entries being compared against characteristics of said event to associate said particular actions with said event.

27. The apparatus of claim 26 wherein said means for accepting further comprises:
means for accepting as input an event identifier and actions; and means for adding said event identifier and said actions to each of said event entries.

28. The apparatus of claim 27 wherein said means for determining further comprises means for:
using said event identifiers to search through said event entries; and
matching said event identifier to a particular event.

29. The apparatus of claim 24 wherein a destination of said means for outputting is a person located at an electronic address on a computer system.

30. A method for receiving a stream of categorized events and associating particular actions to each category of said stream of categorized events, said categorized events being generated by external and internal entities, said method comprising the machine-executed steps of:
accepting as input a user created action association scheme, said action association scheme being used to construct an action table;
receiving as input said categorized event;
applying said categorized event to said action table to determine said particular actions, said particular actions being determined by comparing characteristics of said categorized event with information contained in said action table; and
outputting said particular action to an application program for further processing.

31. The method of claim 30 wherein said outputting step further comprises:
sending said particular actions to a person located at an electronic address on a computer system.

32. The method of claim 31 wherein said creating step further comprises the machine-executed step of:
accepting as user input a plurality of group entries into an action table, said group entries being compared against characteristics of said event to associate said particular actions with said event.

33. The method of claim 32 wherein said inputting step further comprises the machine-executed steps of:
accepting as input a group identifier and actions; and
adding said group identifier and said actions to each of said group entries.

34. The method of claim 33 wherein said determining step further comprises the machine-executed steps of:
using said group identifiers to search through said group entries; and
matching said group identifier to a particular event's categorization.

35. The method of claim 30 wherein said accepting step further comprises the machine-executed steps of:
accepting user input to modify said action association scheme by changing said action table, said action association scheme being modified to change how said event is associated with said particular actions.

36. An apparatus for receiving a stream of categorized events and associating a particular action to each category of said stream of categorized events, said categorized events being generated by external and internal entities, said apparatus being a computer system and comprising:
means for accepting as input a user created action association scheme, said action association scheme being used to construct an action table;
means for receiving as input said categorized event;
means for applying said categorized event to said action table to determine said particular actions, said particular actions being determined by comparing characteristics of said categorized event with information contained in said action table; and
means for outputting said particular actions to an application program for further processing.

37. The apparatus of claim 36 wherein said means for creating further comprises:
means for accepting user input to modify said action association scheme by changing said action table, said action association scheme being modified to change how said event is associated with said particular actions.

38. The apparatus of claim 37 wherein said means for accepting further comprises means for:
accepting as user input a plurality of group entries into said action table, said group entries being compared against characteristics of said categorized event to associate said particular actions with said categorized event.

39. The apparatus of claim 38 wherein said means for inputting further comprises:

means for accepting as input a group identifier and actions; and means for adding said group identifier and said actions to each of said group entries.

40. The apparatus of claim 39 wherein said means for determining further comprises:

means for using said group identifiers to search through said group entries; and means for matching said group identifier to a particular event's categorization.

41. The apparatus of claim 36 wherein a destination of said means for outputting is a person located at an electronic address on a computer system.

42. A method for handling events of an event stream, said events being generated by external and internal entities, said method comprising the machine-executed steps of:

accepting as input a user created categorization scheme and a user created action association scheme, said categorization scheme being used to construct a filter table and said action association scheme being used to construct an action table;

receiving as input said events;

applying said events to said filter table;

categorizing said events into groups of events based on a comparison of said of characteristics of said events with information contained in events with said filter table;

determining, based on application of said groups of events to do said action table, said particular actions, said particular actions being determined by comparing characteristics of said events with information contained in said action table; and outputting said particular actions to an application program for further processing.

43. The method of claim 42 wherein said outputting step further comprises:

sending said particular actions to a person located at an electronic address on a computer system.

44. An apparatus for handling events of an event stream, said events being generated by external and internal entities, said apparatus being a computer system and comprising:

means for accepting as input a user created categorization scheme and a user created action association scheme, said categorization scheme being used to construct a filter table and said action association scheme being used to construct an action table;

means for receiving as input said events;

means for applying said events to said filter table;

means for categorizing said events into groups of events based on a comparison of said of characteristics of said events with information contained in events with said filter table;

means for determining, based on application of said groups of events to to said action table, said particular actions, said particular actions being determined by comparing characteristics of said event with information contained in said action table; and means for outputting said particular actions to an application program for further processing.

45. The apparatus of claim 44 wherein a destination of said means for outputting is a person located at an electronic address on a computer system.

* * * * *